(12) United States Patent
Miyaki

(10) Patent No.: US 10,857,707 B2
(45) Date of Patent: Dec. 8, 2020

(54) INJECTION MOLDING MACHINE FOR COMPOSITE MOLDED PRODUCT

(71) Applicant: Kabushiki Kaisha Meiki Seisakusho, Aichi (JP)

(72) Inventor: Tsuyoshi Miyaki, Nagoya (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 85 days.

(21) Appl. No.: 16/223,619

(22) Filed: Dec. 18, 2018

(65) Prior Publication Data

US 2019/0193313 A1 Jun. 27, 2019

(30) Foreign Application Priority Data

Dec. 25, 2017 (JP) ................................. 2017-247247

(51) Int. Cl.
*B29C 45/14* (2006.01)
*B29C 45/06* (2006.01)
(Continued)

(52) U.S. Cl.
CPC ........ *B29C 45/14549* (2013.01); *B29C 45/06* (2013.01); *B29C 45/07* (2013.01);
(Continued)

(58) Field of Classification Search
CPC ..... B29C 45/07; B29C 45/06; B29C 45/0441; B29C 45/1628; B29C 45/14549; B29C 2045/1632
See application file for complete search history.

(56) References Cited

U.S. PATENT DOCUMENTS 3,924,994 A * 12/1975 Aoki ....................... B29C 45/07
425/574
4,708,625 A * 11/1987 Arend ................. B29C 45/0441
425/589
(Continued)

FOREIGN PATENT DOCUMENTS

EP 2875925 A1 5/2015
JP 05-309708 A 11/1993
(Continued)

OTHER PUBLICATIONS

Cable Chain Design Guidelines—Pt 1,Sep. 21, 2016, LaPP USA, https://www.youtube.com/watch?v=A2rLpVIMGf4, LaPP, 3 pages. (Year: 2016).*

(Continued)

*Primary Examiner* — Xiao S Zhao
*Assistant Examiner* — Emmanuel S Luk
(74) *Attorney, Agent, or Firm* — Renner, Otto, Boisselle & Sklar, LLP

(57) ABSTRACT

An injection molding machine for a composite molded product is an injection molding machine for a composite molded product, in which an injection device or a rotary table is arrayed with a movable platen attached with a movable metal mold and the injection device or the rotary table is driven using an electric motor, wherein, at any position below, side, or rear of the movable platen, a plurality of cableveyors, and which house cables, and connected to the movable metal mold or the movable platen or connected to the injection device in addition to the movable metal mold or the movable platen is disposed in parallel to one another so that longitudinal directions of the cableveyors coincide with a mold opening/closing direction A of the movable platen.

14 Claims, 4 Drawing Sheets

(51) Int. Cl.
   *B29C 45/16*   (2006.01)
   *B29C 45/07*   (2006.01)
   *B29C 45/04*   (2006.01)

(52) U.S. Cl.
   CPC ...... *B29C 45/1628* (2013.01); *B29C 45/0441* (2013.01); *B29K 2905/00* (2013.01)

(56) References Cited

U.S. PATENT DOCUMENTS

| | | | | |
|---|---|---|---|---|
| 4,863,362 | A * | 9/1989 | Hehl | B29C 45/17 425/190 |
| 5,462,428 | A | 10/1995 | Ito et al. | |
| 5,843,487 | A * | 12/1998 | Boyd | B29C 45/03 425/190 |
| 5,863,479 | A * | 1/1999 | Ohsumi | B29C 45/14811 156/153 |
| 2006/0177540 | A1* | 8/2006 | Lichtinger | B29C 45/1628 425/589 |
| 2009/0159207 | A1* | 6/2009 | Currie | B29C 35/02 156/709 |
| 2009/0160098 | A1* | 6/2009 | Currie | B29D 30/0629 264/347 |
| 2011/0159132 | A1* | 6/2011 | Urata | B29C 45/83 425/107 |
| 2012/0087999 | A1* | 4/2012 | Miyagawa | B29C 45/73 425/134 |
| 2012/0328730 | A1* | 12/2012 | Armbruster | B29C 45/1628 425/542 |
| 2014/0322377 | A1* | 10/2014 | Boucherie | B29C 45/762 425/163 |
| 2015/0352760 | A1* | 12/2015 | Zoppas | B29B 11/12 425/88 |
| 2015/0352763 | A1* | 12/2015 | Zoppas | B29C 45/06 264/39 |
| 2015/0367548 | A1* | 12/2015 | Zoppas | B29B 11/12 425/567 |
| 2018/0050477 | A1* | 2/2018 | Duchateau | B29C 45/1761 |
| 2018/0281259 | A1* | 10/2018 | Kashiuchi | B29C 45/80 |
| 2018/0370107 | A1* | 12/2018 | Revol | B29C 45/7312 |
| 2019/0084195 | A1* | 3/2019 | Schneebauer | B29C 45/1628 |
| 2019/0105823 | A1* | 4/2019 | Schad | B29C 45/42 |

FOREIGN PATENT DOCUMENTS

| | | |
|---|---|---|
| JP | 05285984 A | 11/1993 |
| JP | 2004050780 A | 2/2004 |
| JP | 2011-140191 A | 7/2011 |
| JP | 2011140191 A | 7/2011 |
| JP | 2015-100934 A | 6/2015 |

OTHER PUBLICATIONS

Cable Carriers—All series at a glance, KabelSchlepp, https://carriers.utsubaki.com/en-int/products/cable-carriers/, 9 pages. (Year: 2020).*
JP2011140191A—Injection molding machine for two-material molding, Google Patents—translation, https://patents.google.com/patent/JP2011140191A/en?oq=JP+2011-140191, 7 pages. (Year: 2020).*
MacKenzie, Ryan, Selecting Cable/drag/energy Chains for CNC, https://www.instructables.com/id/Selecting-cabledragenergy-chains-for-CNC/, 16 pages. (Year: 2015).*

* cited by examiner

INJECTION MOLDING MACHINE FOR COMPOSITE MOLDED PRODUCT

CROSS REFERENCE TO RELATED APPLICATIONS

This application claims the priority benefit of Japanese Patent Application No. 2017-247247, filed on Dec. 25, 2017. The entirety of the above-mentioned patent application is hereby incorporated by reference herein and made a part of this specification.

BACKGROUND OF THE INVENTION

(1) Field of the Invention

The present invention relates to an injection molding machine for a composite molded product, in which an injection device or a rotary table is arrayed with a movable platen attached with a movable metal mold and the injection device or the rotary table is driven using an electric motor.

(2) Description of Related Art

An injection molding machine itself in which cables and others are connected to a movable unit using a cableveyor (registered trademark) is publicly known, and those described in Japanese Patent Application Laid-Open No. H05-285984 (claim 4, FIG. 3) and Japanese Patent Application Laid-Open No. 2004-50780 (claim 1, 0031, FIG. 1) are known. Japanese Patent Application Laid-Open No. H05-285984 (claim 4, FIG. 3) describes that cables to an injection device of an injection molding machine are divided into that for communication and that for power and are housed respectively in cableveyors for communication and power.

Moreover, Japanese Patent Application Laid-Open No. 2011-140191 (claim 1, 0019, FIG. 4) relates to an injection molding machine for two-material molding, and describes that an electricity supply wire connected to a reverse mold platen or a reverse metal mold and a water or oil supply pipe connected thereto are housed in a cableveyor 62. Moreover, Japanese Patent Application Laid-Open No. 2004-50780 (claim 1, 0031, FIG. 1) relates to a metal mold-reversing molding machine, and describes that respective linear bodies such as a temperature control-heating medium, a pressure fluid, power, and a signal are housed in a cableveyor 20.

SUMMARY OF THE INVENTION

However, Japanese Patent Application Laid-Open No. H05-285984 (claim 4, FIG. 3) never describes that cables other than an electrical cable are housed in the cableveyor. Moreover, Japanese Patent Application Laid-Open No. 2011-140191 (claim 1, 0019, FIG. 4) and Japanese Patent Application Laid-Open No. 2004-50780 (claim 1, 0031, FIG. 1) also describe that the water or oil supply pipe other than the electricity supply wire is housed in the cableveyor; however, only assume that all the wires and the like are housed in one cableveyor.

Therefore, in Japanese Patent Application Laid-Open No. H05-285984 (claim 4, FIG. 3) and Japanese Patent Application Laid-Open No. 2004-50780 (claim 1, 0031, FIG. 1), which are described above, when the number of such electrical cables, hydraulic oil hoses, and temperature control hoses is increased, there are no measures regarding how to house the increased hoses in the cableveyor and how to dispose cableveyors when the number of cableveyors is increased to a plurality. Therefore, there has been a problem that it takes time and effort to investigate which pipe is housed in which cableveyor at the time of maintenance in the case of using a plurality of cableveyors. Moreover, there has also been a problem that a space for installing other instruments is restricted by the fact that the plurality of cableveyors is not disposed at optimum places when the cableveyors are provided.

In this connection, the present invention deals with the problems described above. It is an object of the present invention to provide an injection molding machine for a composite molded product, which enables enhancement of maintenance easiness of cables and efficient disposition of a plurality of cableveyors.

An injection molding machine for a composite molded product according to one aspect of the present invention is an injection molding machine for a composite molded product, in which an injection device or a rotary table is arrayed with a movable platen attached with a movable metal mold and the injection device or the rotary table is driven using an electric motor, wherein, at any position below, side, or rear of the movable platen, a plurality of cableveyors which houses cables connected to the movable metal mold or the movable platen or connected to the injection device in addition to the movable metal mold or the movable platen is disposed in parallel to one another so that longitudinal directions of the cableveyors coincide with a mold opening/closing direction of the movable platen.

An injection molding machine for a composite molded product according to an embodiment of the present invention is the injection molding machine for a composite molded product wherein at least an electrical cable, a hydraulic oil cable, and a temperature control medium cable are housed in the plurality of cableveyors, and at least the electrical cable and the temperature control medium cable are housed in different cableveyors.

An injection molding machine for a composite molded product according to an embodiment of the present invention is the injection molding machine for a composite molded product wherein a first cableveyor that houses the electrical cable, a second cableveyor that houses the hydraulic oil cable and a third cableveyor that houses the temperature control medium cable are individually provided.

An injection molding machine for a composite molded product according to an embodiment of the present invention is the injection molding machine for a composite molded product wherein an intermediate metal mold that rotates about an axis in a direction perpendicular to a mold opening/closing direction is provided between a stationary platen attached with a stationary metal mold and the movable platen attached with the movable metal mold, a first injection device is provided on one side of the stationary platen, and a second injection device is provided on the other side of the movable plate to be movable together with the movable platen.

An injection molding machine for a composite molded product according to an embodiment of the present invention is the injection molding machine for a composite molded product wherein the intermediate metal mold that rotates about the axis in the direction perpendicular to the mold opening/closing direction is provided between the stationary platen attached with the stationary metal mold and the movable platen attached with the movable metal mold, the first injection device is provided on one side of the stationary platen, and the second injection device is provided on rear of the movable plate to be movable together with the movable platen.

An injection molding machine for a composite molded product according to an embodiment of the present invention is the injection molding machine for a composite molded product wherein the intermediate metal mold that rotates about the axis in the direction perpendicular to the mold opening/closing direction is provided between the stationary platen attached with the stationary metal mold and the movable platen attached with the movable metal mold, the first injection device is provided on one side of the stationary platen, and the second injection device is provided on rear of the movable plate to be movable together with the movable platen.

An injection molding machine for a composite molded product according to an embodiment of the present invention is the injection molding machine for a composite molded product wherein the rotary table attached with the movable metal mold is attached to the movable platen to be rotatable by the electric motor, and the movable metal mold or the movable platen is attached with a hydraulic cylinder.

An injection molding machine for a composite molded product according to an embodiment of the present invention is the injection molding machine for a composite molded product wherein a rotary table attached with the movable metal mold is attached to the movable platen to be rotatable by an electric motor, and the movable metal mold or the movable platen is attached with the hydraulic cylinder.

An injection molding machine for a composite molded product according to an embodiment of the present invention is the injection molding machine for a composite molded product wherein the rotary table attached with the movable metal mold is attached to the movable platen to be rotatable by the electric motor, and the movable metal mold or the movable platen is attached with the hydraulic cylinder.

The injection molding machine for a composite molded product according to the present invention is an injection molding machine for a composite molded product, in which an injection device or a rotary table is arrayed with a movable platen attached with a movable metal mold and the injection device or the rotary table is driven using an electric motor, wherein, at any position below, side, or rear of the movable platen, a plurality of cableveyors which houses cables connected to the movable metal mold or the movable platen or connected to the injection device in addition to the movable metal mold or the movable platen is disposed in parallel to one another so that longitudinal directions of the cableveyors coincide with a mold opening/closing direction of the movable platen. Accordingly, the plurality of cableveyors can be disposed efficiently.

DETAILED DESCRIPTION OF PREFERRED EMBODIMENTS

Figure 1:
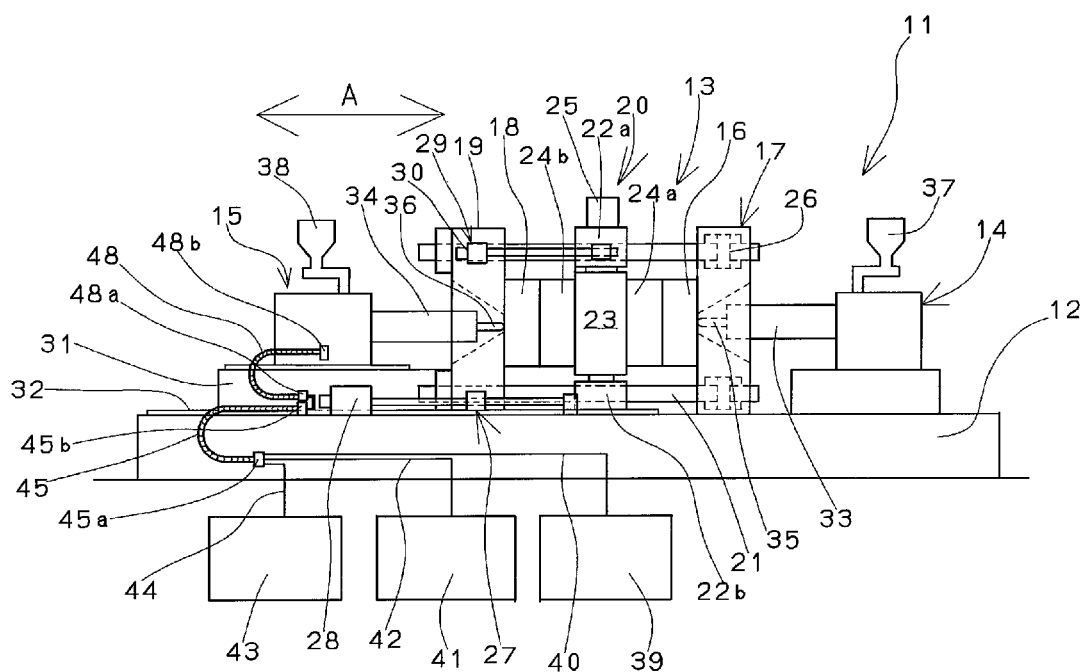
FIG. 1 is a front view illustrating a state where molds of an injection molding machine for a composite molded product according to a first embodiment are closed.

An injection molding machine 11 for a composite molded product according to a first embodiment will be described with reference to FIGS. 1 to 3. A basic portion of the injection molding machine 11 is composed of: a mold clamping device 13 mounted on a bed 12; and a stationary-side first injection device 14 and a movable-side second injection device 15, which are provided on both sides of the mold clamping device 13. The mold clamping device 13 will be described. An intermediate platen 20 that is a second movable platen is disposed so as to be freely movable in a mold opening/closing direction between a stationary platen 17 attached with a stationary metal mold 16 and a movable platen 19 that is a first movable platen attached with a movable metal mold 18 that is a first movable metal mold. The intermediate platen 20 is composed of: upper and lower frame portions 22a and 22b inserted through tie bars 21; and a freely rotatable rotary platen 23 axially supported by a rotary shaft on the frame portions 22a and 22b, and the rotary platen 23 is attached with intermediate metal molds 24a and 24b which are second movable metal molds. Then, the rotary platen 23 is rotated by a servo motor 25 for rotating the intermediate metal mold. The servo motor 25 is disposed on the upper frame portion 22a.

Then, mold clamping cylinders 26 are individually provided near four corners of the stationary platen 17, and the tie bars 21 are composed of piston rods of the mold clamping cylinders 26. Moreover, the first movable platen 19 is made movable in the mold opening/closing direction by a servo motor 28 of a first mold opening/closing mechanism 27. Furthermore, the intermediate platen 20 is made movable in the mold opening/closing direction by each servo motor 30 of a second mold opening/closing mechanism 29. Note that two second mold opening/closing mechanisms 29 are illustrated; however, the number thereof may be four or others.

On a non-metal mold attachment surface side (rear side) of the movable platen 19, a base 31 on which the second injection device 15 is mounted is stationarily attached to the movable platen 19. Then, the movable platen 19 and the base 31 are made movable in such a mold opening/closing direction A while being guided on guides 32 and the like on the bed 12. Then, with respect to the base 31, the second injection device 15 is made movable in the mold opening/closing direction by a nozzle touch mechanism (not illustrated) using a hydraulic cylinder or an electric motor-driven mechanism.

Then, each of the first injection device 14 and the second injection device 15 is operated by an injecting servo motor and a measuring servo motor (not illustrated), and the platen near a material supply port of each thereof is cooled by receiving a flow of a temperature control medium. Moreover, heating cylinders 33 and 34 and nozzles 35 and 36 of the respective first injection device 14 and second injection device 15 are heated by heaters. Then, the first injection device 14 and the second injection device 15 are attached respectively with material supply devices 37 and 38 operated by electric motors, air, or the like.

In an inside of each of the stationary metal mold 16, the movable metal mold 18, and the intermediate metal molds 24a and 24b, a flow path of the temperature control medium for controlling a metal mold temperature is formed. Moreover, each of the stationary metal mold 16 and the movable metal mold 18 builds therein a hot runner for heating an injected runner portion and a hydraulic cylinder for operating a heater for the hot runner and operating a gate valve.

Furthermore, at least one of the stationary metal mold 16, the movable metal mold 18, and the intermediate metal molds 24*a* and 24*b* is provided with a hydraulic cylinder for operating a movable core.

Moreover, the stationary platen 17 and the movable platen 19 and the intermediate platen 20 which are movable units are attached with hydraulic clamping devices, electromagnets, and the like for fixing the metal molds 16, 18, 24*a* and 24*b*. Furthermore, according to needs for measures against thermal expansion, at least one of the stationary platen 17, the first movable platen 19, and the intermediate platen 20 may also be subjected to such a temperature control by receiving a flow of the temperature control medium. Besides, at least one of the platens 17, 19, and 20 is attached with an ejector mechanism operated by an electric motor such as a servo motor or a hydraulic cylinder. In this embodiment, the ejector mechanism is provided in the movable platen 19. Moreover, in some cases, at least one of the platens and the metal molds is attached with a mechanism for accelerating mold release by a hydraulic pressure or air, and in some cases, is attached with varieties of sensors and cameras.

In any case, the stationary platen 17, the movable platen 19, the intermediate platen 20, the stationary metal mold 16, the movable metal mold 18, and the intermediate metal molds 24*a* and 24*b* are provided with large numbers of electric motors, hydraulic instruments, and temperature control flow paths. Hence, it is necessary to connect an electrical cable 40, which includes a power and signal cables from a control device 39 provided outside of the injection molding machine 11 or inside the bed 12, to the movable platen 19, the movable metal mold 18, and the like which are the movable units described above. Moreover, it is necessary to connect a hydraulic oil hose 42 from a hydraulic device 41 including a pump to the mold clamping cylinders 26 and the hydraulic cylinders of the movable platen 19, the movable metal mold 18, and the like which are described above. Furthermore, it is necessary to connect a temperature control medium hose 44 from a temperature control device 43 to the flow paths of the above-described movable metal mold 18 and the like. In the present invention, the electrical cable 40, the hydraulic oil hose 42, the temperature control medium hose 44, and the like will be collectively referred to as cables.

In the first embodiment, particularly, the movable platen 19 and the second injection device 15 are formed as an integrated movable unit, and accordingly, it is necessary to connect many cables thereto. However, with regard to these cables, positions and bent states of moving ends thereof attached to the movable plate 19 and the like are changed together with mold opening/closing movement of the movable platen 19 and the intermediate platen 20. Hence, when the individual cables are connected to the movable platen 19 and the like in a state where intermediate portions thereof are separated from one another, then in some cases, the cables are tangled with one another and broken due to friction. Moreover, the state where the cables are connected in the separated state is not good in terms of appearance, and in addition, the individual cables hinder operations in some cases. Accordingly, in the present invention, the above-described cables are carried and guided to the movable platen and the like using cableveyors 45, 46, 47, 48, and the like.

More specifically, in the first embodiment, a plurality of the cableveyors 45, 46, 47, and 48 is disposed in parallel to one another at any position below, side, or rear of the movable platen 19 so that longitudinal directions of the cableveyors coincide with the mold opening/closing direction of the movable platen. Note that, in the present invention, definition of the cableveyor is not limited to the product of the enterprise that holds the registered trademark. The cableveyor includes a variety of flexible cable protection tools which bundle, carry, and guide the cables in an inside of a carrier body. All those called a cable protection chain, a cable chain, and the like are also included in the cableveyor. That is, the cableveyor is a device that carries and guides cables or hoses. Note that, in some cases, a large number of cableveyors including a cableveyor for connecting the cables to the first injection device 14 are used in the injection molding machine 11 for a composite molded product; however, the cableveyors 45, 46, 47, and 48 will be described focusing on the same.

Since the cableveyors 45 and the like themselves are known in public, a detailed description thereof will be omitted; however, the cableveyors 45 and the like are formed of resin such as super engineering plastics or metal. Then, in each of the cableveyors 45 and the like, a structure having a U-shape in cross section is formed of: two side band portions in each of which respective link portions are coupled to one another; and an arm portion that couples the two side band portions to each other. Each of the cableveyors 45 and the like has therein a space in which the cables can be housed. Note that, when housing the cables in the space of each of the cableveyors 45 and the like, the respective cables may be housed using a partition plate. Then, after the cables are housed in the space of each of the cableveyors 45 and the like, an open side of the structure having a U-shape in cross section is closed by another arm portion. Moreover, in both ends 45*a* and 45*b* of the cableveyor 45 in the longitudinal direction where the link portions of the cableveyor 45 are provided continuously with one another, opening portions for taking out the cables are individually provided. By the structure described above, the cableveyor 45 collectively carries and guides the cables housed therein, and in addition, the cableveyor 45 enables the cables to be freely distributed and extended from the opening portions of both ends 45*a* and 45*b* of the cableveyor 45 toward the outside.

In the first embodiment, the cableveyor 45 and the like are prepared under a side of the movable platen 19 or under the rear of the movable platen 19 (that is, on the second injection device 15 side) in accordance with a type of the cables. That is, the electrical cable 40 connected from the control device 39 to the variety of instruments such as the servo motor for the ejector (not illustrated) of the movable platen 19, the mold opening/closing servo motor 30 of the second mold opening/closing mechanism 29, the signal cables for the varieties of valves and sensors, the injecting servo motor and measuring servo motor of the second injection device 15, and the material supply device 38 is housed in the first cableveyor 45 located on an operation side (lower side in FIG. 2) when viewed from above in FIG. 2. With regard to the electrical cable 40, the power cable and the signal cable are housed while being appropriately isolated from each other by the partition plate. Moreover, the respective signal cables may be bundled to be housed in a single hollow hose. Furthermore, the respective cables of the electrical cable 40 in the first cableveyor 45 may be appropriately bundled with each other by a bundling member.

In this embodiment, each of the cableveyor 45 and the like is used by a standard installation method in which a free span is provided on an upper side. Hence, one end on a lower side of the first cableveyor 45 is a fixed end 45*a*, which is fixed to the bed 12 (including a side of the bed 12). Then, the electrical cable 40 extended from the fixed end 45a-side opening portion of the cableveyor 45 is connected to the control device 39. Moreover, the moving end 45b of the first cableveyor 45 is fixed to a member connected to the movable platen 19. Then, a part of the electrical cable 40 extended from the moving end 45b-side opening portion is directly connected to the servo motor for the ejector of the movable platen 19, and another part thereof is connected to the injecting servo motor and measuring servo motor of the second injection device 15 through another fourth cableveyor 48. Note that, in the first embodiment, the first cableveyor 45 is installed in the mold opening/closing direction on the side of the bed 12; however, may be installed in the bed 12 if there is a space in the bed 12. Moreover, the moving end 45b of the cableveyor 45 may be directly fixed to the base 31 of the second injection device 15 and to the movable platen 19.

The hydraulic oil hose 42 that supplies hydraulic oil to the hydraulic cylinder of the nozzle touch mechanism of the second injection device 15, a hydraulic cylinder for a movable core of the movable metal mold 18, a hydraulic cylinder for the gate valve, a hydraulic cylinder for a metal mold clamp of the movable platen 19, and the like is housed in the second cableveyor 46 disposed inside the base 31 of the second injection device 15 located on the center of the bed 12. Then, a fixed end 46a on a lower side of the second cableveyor 46 is fixed to a bed 12-side member. Then, the hydraulic oil hose 42 extended from a fixed end 46a-side opening portion is connected to the hydraulic device 41. Moreover, a moving end 46b on an upper side of the second cableveyor 46 is fixed to the base 31 or the movable platen 19. Then, the hydraulic oil hose 42 extended from the moving end 46b-side opening portion is connected to the movable platen 19, the hydraulic cylinder of the movable metal mold 18, and the like.

Figure 2:
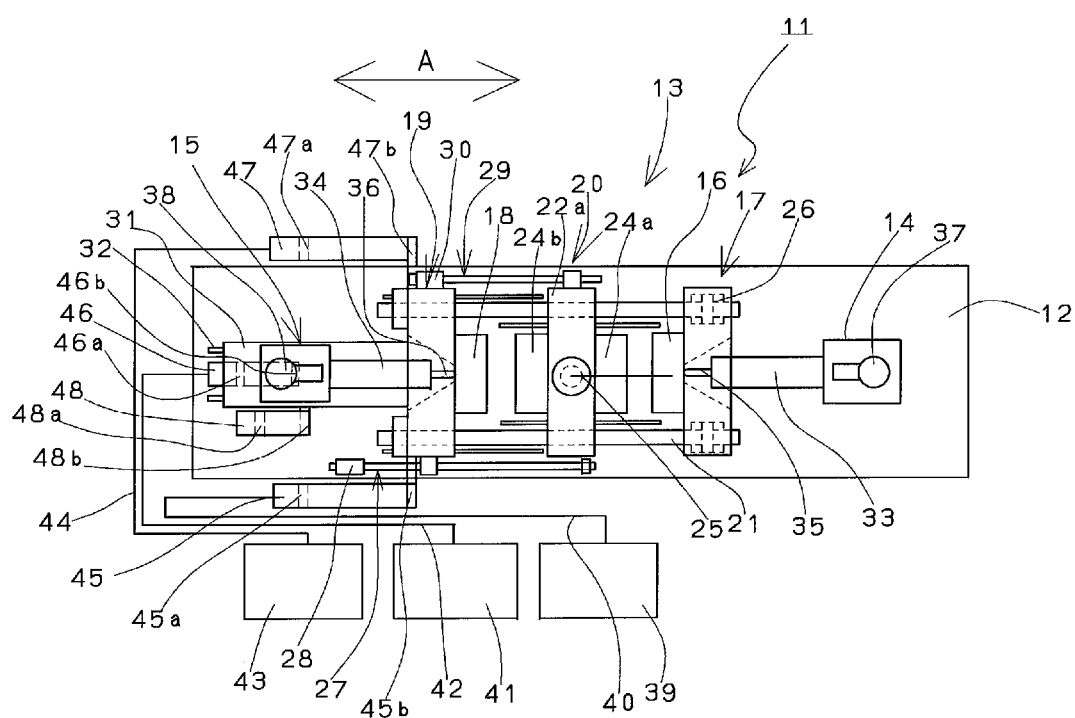
FIG. 2 is a plan view illustrating a state where the molds of the injection molding machine for a composite molded product according to the first embodiment are opened.

The temperature control medium hose 44 for sending temperature control water to the movable metal mold 18 is housed in the third cableveyor 47 located on a non-operation side (upper side in FIG. 2) in FIG. 2 when viewed from above. Then, a lower-side fixed end 47a in the third cableveyor 47 is fixed to a bed 12 (including the side of the bed) side. Then, the temperature control medium hose 44 extended from the fixed end 47a-side opening portion of the cableveyor 47 is connected to the temperature control device 43. Moreover, the upper-side moving end 47b of the third cableveyor 47 is fixed to a member connected to the movable platen 19. Then, the temperature control medium hose 44 extended from the moving end 47b-side opening portion is connected to the movable metal mold 18 through the movable platen 19. The movable platen 19 is operated a large number of times at the molding time. Accordingly, the third cableveyor 47 that houses the temperature control medium hose 44 and the cableveyor 45 that houses the electrical cable 40 are isolated from each other, whereby, even if water leaks from a connection portion and the like of the temperature control medium hose 44, the water does not fall on the electrical cable 40, and an occurrence of a short circuit, current leakage, or the like can be prevented.

Moreover, with respect to the base 31 that is the movable unit, the second injection device 15 that is the movable unit is provided so as to be further movable forward and backward, and accordingly, the electrical cable 40 for operating the second injection device 15, and the temperature control medium hose 44 are housed in the fourth cableveyor 48 while being divided by a partition plate. Then, a fixed end 48a on a lower side of the fourth cableveyor 48 is fixed to a base 31 side. The second injection device 15 is always in a nozzle touch state at the molding time, and does not often move forward and backward except the case of maintenance, and the number of cables connected only to the second injection device 15 is small. Accordingly, here, the electrical cable and the temperature control medium cable are housed in the same fourth cableveyor 48. However, different cableveyors may be used.

Then, the electrical cable 40 and the temperature control medium hose 44, which are guided to the base side by the first cableveyor 45 as described above, are partially inserted from a fixed end 48a-side opening portion of the fourth cableveyor 48. Moreover, a moving end 48b on an upper side of the fourth cableveyor 48 is connected to a member of the second injection device 15 that moves forward and backward by the nozzle touch mechanism. Then, the electrical cable 40 extended from the moving end 45b-side opening portion is connected to the injecting servo motor, the measuring servo motor, the heaters of the heating cylinder 34 and the nozzle 36, and the like, and in addition, the temperature control medium hose 44 is connected to a block around the material supply port.

The first cableveyor 45 and the fourth cableveyor 48 are combined with each other as described above, whereby it is possible to deal with both of the forward and backward movement of the movable unit composed of the movable platen 19, the second injection device 15, and the base 31 by the first mold opening/closing mechanism 27 and the forward and backward movement of the second injection device 15 on the base 31 by the nozzle touch mechanism.

Note that, in this embodiment, the number of the cableveyors 45, 46, and 47 disposed on the rear or side of the movable platen 19 is three which are the first cableveyor 45 for the electrical cable, the second cableveyor 46 for the hydraulic oil, and the third cableveyor 47 for the temperature control medium cable; however, when the cables are many, four or more cableveyors may be disposed so that portions of free spans thereof are parallel to one another. Moreover, when the plurality of cableveyors is provided, it is as desirable as possible that at least the electrical cable and the temperature control medium cable be housed in different cableveyors. In this way, even if water leaks from the temperature control medium cable, a possibility that current leakage or a short circuit may occur can be reduced.

Moreover, among the electrical cables, an alternating-current power cable and other cables including a direct-current power cable and a signal line may be housed separately in different cableveyors. In this way, an influence from noise from the alternating-current power cable can be prevented. In this case, when the number of the cableveyors is not desired to be increased, the alternating-current power cable and the hydraulic oil hose may be housed in one cableveyor, and the other cables and lines which include the direct-current power cable, the signal line and the rest of the hydraulic oil hoses may be housed in other cableveyors. Alternatively, also when all the electrical cables are housed in one cableveyor, it is desirable that, using a partition plate, a group including the alternating-current power cable and a group including the other cables and lines which include the direct-current power cable and the signal line be housed separately from each other.

Figure 3:
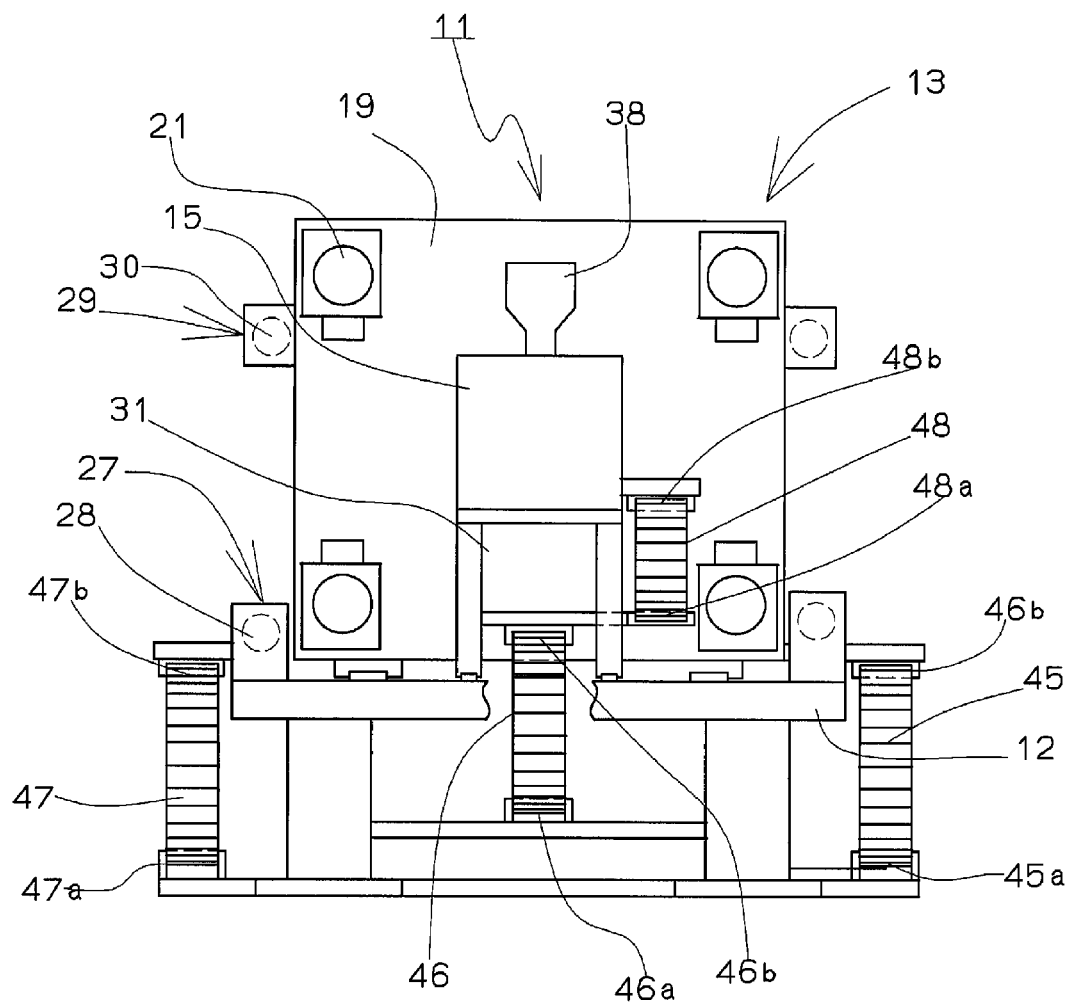
FIG. 3 is a side view of the injection molding machine according to the first embodiment.

Moreover, though not illustrated in FIG. 1 to FIG. 3, the present invention may adopt a configuration in which a plurality of cableveyors connected to the intermediate platen 20 that is the second movable platen is disposed at a position in the bed 12 under the intermediate platen 20 or a position on the side of the bed 12. On the intermediate platen 20, the intermediate metal molds 24a and 24b which are the second movable metal molds are disposed, and mechanisms such as a hydraulic core and a hydraulic clamp which are operated by the hydraulic cylinders are mounted. Moreover, the intermediate platen 20 is attached with opening/closing valves and the like for operating the hydraulic cylinders and the like. Furthermore, the intermediate platen 20 is attached with the servo motor 25 for rotating the rotary platen 23 and the intermediate metal molds 24a and 24b. Moreover, the temperature control flow paths are provided in the intermediate metal molds 24a and 24b. Furthermore, in some cases, a temperature control flow path is provided also in the rotary platen 23 that constitutes the intermediate platen 20. Therefore, to the intermediate platen 20, connected are the electrical cables such as the power line and the signal line for the servo motor 25 and the opening/closing valves, the hydraulic oil hose, and the temperature control hose. Hence, it is also conceivable that, in a similar way to the first movable platen 19, the variety of cables are classified in terms of types and housed in a plurality of cableveyors, moving ends of the plurality of cableveyors are fixed to the frame portion 22b as a lower portion of the intermediate platen 20, and fixed ends of the cableveyors are fixed to the bed side.

Next, a brief description will be given of behaviors of the cableveyor 45 and the like at the molding time (mold opening/closing time) by the movable platen 19 and intermediate platen 20 of the injection molding machine 11 for a composite molded product according to the first embodiment. When the first movable platen 19 is at a mold opening time, the moving end 45b of the cableveyor 45 is located at a retreated position together with the movable platen 19, and a part of a free span portion as an upper portion of the cableveyor 45 is bent. Moreover, when the movable platen 19 is at a mold closing time, the moving end 45b is moved forward together with the movable platen 19, and the free span portion entirely serves as the upper portion. Hence, at the mold opening/closing time, the cables in the cableveyor 45 are not pulled by applied excessive force, and the cables do not abrade one another, or are not entangled in one another. Moreover, also with regard to the fourth cableveyor 48, when the second injection device 15 is retreated due to maintenance and the like, both of the moving end 48b and the free span portion are retreated, and when the second injection device 15 advances, both of the moving end 48b and the free span portion advance.

In the injection molding machine 11 for a composite molded product, the cableveyors 45 and the like are prepared in accordance with the type of the cables. Accordingly, at the maintenance time of exchanging the cables, and so on, it is easy to confirm where the cables pass. Moreover, also when the power cable and the hydraulic oil hose are housed in the same cableveyor, the power cable and the hydraulic oil hose are housed while being isolated from each other by the partition plate. Accordingly, it becomes possible to confirm the positions of the cables.

Figure 4:
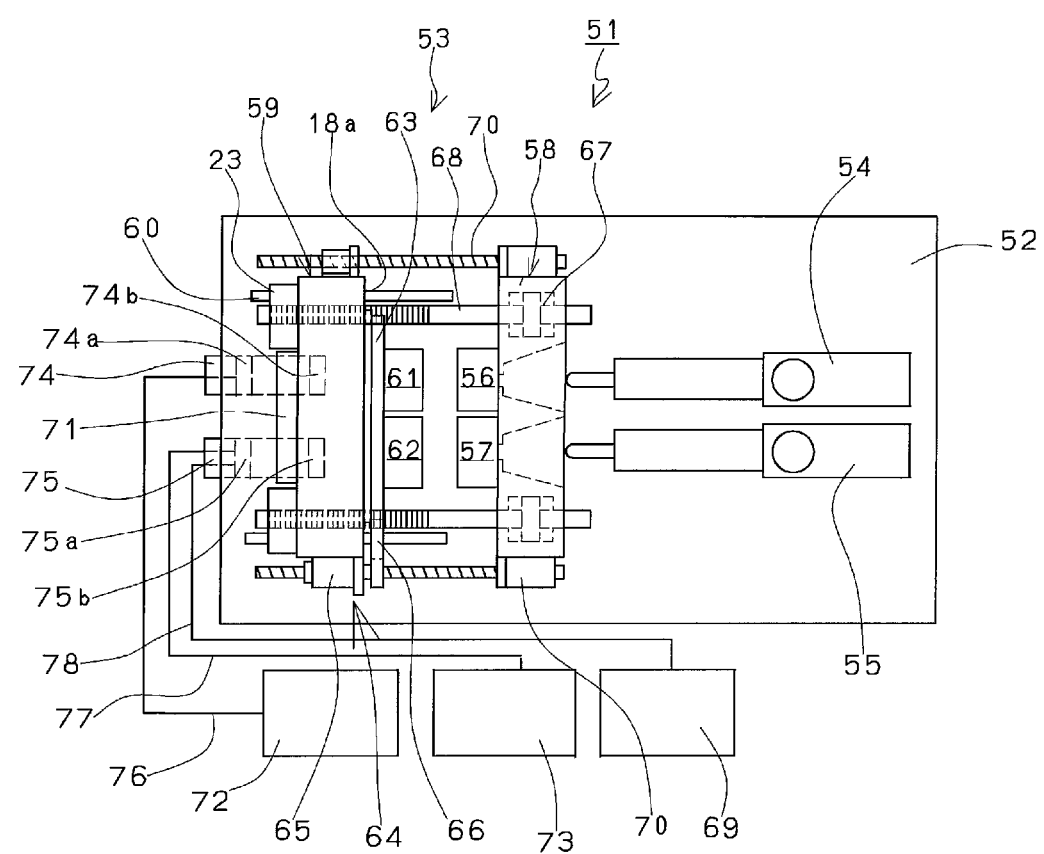
FIG. 4 is a plan view illustrating a state where molds of an injection molding machine for a composite molded product according to a second embodiment are opened.

Next, an injection molding machine 51 for a composite molded product according to a second embodiment of the present invention will be described with reference to FIG. 4. The horizontal-type injection molding machine 51 for a composite molded product is composed of a mold clamping device 53 and two injection devices 54 and 55, which are disposed on a bed 52. In the mold clamping device 53, a stationary platen 58 attached with stationary metal molds 56 and 57 is stationarily disposed on the bed 52. Moreover, with respect to the stationary platen 58, a movable platen 59 is disposed to be freely movable in the mold opening/closing direction on guides 60 on an upper surface of the bed 52. To the movable platen 59, a rotary table 63 to which movable metal molds 61 and 62 which are also rotary metal molds are attached is attached to be freely rotatable by a rotary mechanism 64. The rotary mechanism 64 receives driving force transmitted by a belt 66 or a gear from a servo motor 65 that is an electric motor fixed to the movable platen 59, and rotates the rotary table 63 in forward and reverse directions.

Mold clamping cylinders 67 which are actuators of a mold clamping mechanism are individually provided near four corners of the stationary platen 58, and rods of the mold clamping cylinders 67 constitute tie bars 68. Then, the above-described tie bars 68 are inserted through guide holes near four corners of the movable platen 59. The mold clamping cylinders 67 are hydraulically operated, and is fed with oil from a hydraulic device 69.

The movable platen 59 is provided to be movable in the mold opening/closing direction by a mold opening/closing mechanism 70. Then, the movable platen 59 is attached with an ejector mechanism 71 operated by a servo motor or a hydraulic cylinder. Moreover, a control device 72, a temperature control device 73 and the hydraulic device 69 are provided outside of the injection molding machine 51 for a composite molded product or inside the bed 52. Note that, here, the description will be given on the assumption that a servo amplifier in the case of using such servo motors for the injection devices 54 and 55, the rotary mechanism 64 of the rotary table 63, the mold opening/closing mechanism 70, and the ejector mechanism 71 is also included in the control device 72. Note that, in the embodiment in FIG. 4, one of the injection devices 54 and 55 may be provided on the side of the injection molding machine 51 for a composite molded product or on the movable platen. When the injection device is attached to the movable platen 59, electrical cables and temperature control medium cables for the injection device are connected to the movable platen 59 with a cableveyor 74 and the like interposed therebetween as in the first embodiment.

Moreover, the movable metal molds 61 and 62 are provided with movable cores (not illustrated), and are also attached with hydraulic cylinders for operating the movable cores. Furthermore, flow paths for flowing water or the like which is a temperature control medium are individually formed in the movable metal molds 61 and 62. Moreover, the movable platen 59 is attached with a solenoid valve for operating the hydraulic cylinder. Note that temperature control medium hoses connected to the temperature control flow paths of the movable metal molds 61 and 62 and hydraulic oil hoses connected to the hydraulic cylinders thereof may be connected to the above-described flow paths and hydraulic cylinders through a rotary shaft of the rotary table 63, or may be directly connected from the movable platen 59 to the movable metal molds 61 and 62.

Then, at positions below the movable platen 59, the plural cableveyors 74 and 75 which house the cables connected to the movable metal molds 61 and 62 or the movable platen 59 are disposed in parallel to each other so that longitudinal directions of the cableveyors 74 and 75 coincide with the mold opening/closing direction of the movable platen 59. Here, in a similar way to the first embodiment, the cables refer to the electrical cable 76, the hydraulic oil hose 77, and the temperature control medium hose 78; however, may also include air cables and like which are other than the above.

In the second embodiment, two cableveyors are disposed in parallel to each other. One of the cableveyors is the first cableveyor 74 that houses the electrical cable 76 including the power cables connected to the servo motors for the rotary mechanism 64 of the rotary table and the ejector mechanism 71 and signal lines for the solenoid valve and the like, and the other cableyor is the second cableveyor 75 that houses the hydraulic oil hose 77 and the temperature control medium hose 78, which are other than the electrical cable 76. Then, fixed ends 74a and 75a of the cableveyors 74 and 75 are fixed to a member on the bed 52 side, and moving ends 74b and 75b are fixed to a member of the movable platen 59. Then, the electrical cable 76 taken outside from the moving end 74b of the first cableveyor 74 is connected to the servo motor and the like. Moreover, as described above, the hydraulic oil hose 77 and the temperature control medium hose 78 which are taken outside from the moving end 75b of the second cableveyor 75 are also connected to the respective portions of the movable platen 59 or to the movable metal molds 61 and 62. Note that, since the movable platen 59 is operated highly frequently, the hydraulic oil hose 77 may be housed in the same cableveyor as that for the electrical cable 76; however, desirably, the electrical cable 76 and the temperature control medium hose 78 in the case of using water are housed in different cableveyors.

Note that, also in the second embodiment, the number of a plurality of the cableveyors may be three which are for the electrical cable, the hydraulic oil hose, and the temperature control medium hose. Moreover, also with regard to the positions where the cableveyors 74 and 75 of the injection molding machine 51 for a composite molded product, in such a case where a height of the bed is low, the cableveyors 74 and 75 may be provided on the side of the movable platen 59 (the side including side upper and side lower) or on the rear of the movable platen 59 (the rear including rear upper and rear lower). In any case, the cableveyors 74 and 75 are disposed as described above, whereby a space in the bed 52, which is located below the injection devices 54 and 55 and below the stationary platen 58, can be effectively used as an installation space of the control device 72 and the hydraulic device 69. Moreover, it enhances maintenance easiness of the variety of cables, and a good appearance is obtained.

The invention of the present application is not limited to the above-described embodiments though modified examples thereof are not mentioned, and it goes without saying that combinations of the above descriptions and additions and changes which are made based on the spirit of the invention of the present application by those skilled in the art are also applicable. The molding machine of the invention of the present application may be a diecast molding machine in the injection molding machine.

What is claimed is:

1. An injection molding machine for a composite molded product, in which an injection device or a rotary table is arrayed with a movable platen attached with a movable metal mold and the injection device or the rotary table is driven using an electric motor,
   wherein, at any position below, side, or rear of the movable platen,
   three or more cable carrying-and-guiding devices are provided for carrying and guiding cables, wherein each cable carrying-and-guiding device includes a structure formed of two side band portions in each of which respective link portions are coupled to one another, and an arm portion that couples the two side portions to each other, wherein the structure of the cable carrying-and-guiding device defines a space for housing cables,
   wherein the three or more cable carrying-and-guiding devices are configured to house cables connected to the movable metal mold or the movable platen or connected to the injection device in addition to the movable metal mold or the movable platen;
   wherein the three or more cable carrying and guiding devices are disposed in parallel to one another so that longitudinal directions of the cable carrying-and-guiding devices coincide with a mold opening/closing direction of the movable platen;
   wherein the three or more cable carrying-and-guiding devices are located at different positions in a direction from an operation side to a non-operation side of the injection molding machine;
   wherein each of the three or more cable carrying-and-guiding devices includes a fixed end and a moving end located upward relative to the respective fixed end,
   wherein each fixed end is fixed to a bed or a bed side member of the injection molding machine,
   wherein the moving end is fixed to the movable platen or a structural member connected to the movable platen.

2. The injection molding machine for a composite molded product according to claim 1, wherein at least an electrical cable, a hydraulic oil cable and a temperature control medium cable are housed in the three or more cable carrying-and-guiding devices, and
   at least the electrical cable and the temperature control medium cable are housed in different cable carrying-and-guiding devices.

3. The injection molding machine for a composite molded product according to claim 2, wherein a first cable carrying-and-guiding device that houses the electrical cable, a second cable carrying-and-guiding device that houses the hydraulic oil cable, and a third cable carrying-and-guiding device that houses the temperature control medium cable are individually provided.

4. The injection molding machine for a composite molded product according to claim 1, wherein an intermediate metal mold that rotates about an axis in a direction perpendicular to a mold opening/closing direction is provided between a stationary platen attached with a stationary metal mold and the movable platen attached with the movable metal mold,
   a first injection device is provided on one side of the stationary platen,
   a second injection device is provided on rear of the movable platen to be movable together with the movable platen; and
   wherein a fourth cable carrying-and-guiding device is connected to the second injection device.

5. The injection molding machine for a composite molded product according to claim 2, wherein an intermediate metal mold that rotates about an axis in the direction perpendicular to the mold opening/closing direction is provided between a stationary platen attached with a stationary metal mold and the movable platen attached with the movable metal mold,
   a first injection device is provided on one side of the stationary platen, and
   a second injection device is provided on rear of the movable plate to be movable together with the movable platen; and
   wherein a fourth cable carrying-and-guiding device is connected to the second injection device.

6. The injection molding machine for a composite molded product according to claim 3, wherein an intermediate metal mold that rotates about an axis in the direction perpendicular to the mold opening/closing direction is provided between a stationary platen attached with a stationary metal mold and the movable platen attached with the movable metal mold,
   a first injection device is provided on one side of the stationary platen, and a second injection device is provided on rear of the movable plate to be movable together with the movable platen; and wherein a fourth cable carrying-and-guiding device is connected to the second injection device.

7. The injection molding machine for a composite molded product according to claim 1, wherein the rotary table attached with the movable metal mold is attached to the movable platen to be rotatable by the electric motor, and the movable metal mold or the movable platen is attached with a hydraulic cylinder.

8. The injection molding machine for a composite molded product according to claim 2, wherein the rotary table attached with the movable metal mold is attached to the movable platen to be rotatable by an electric motor, and the movable metal mold or the movable platen is attached with a hydraulic cylinder.

9. The injection molding machine for a composite molded product according to claim 3, wherein the rotary table attached with the movable metal mold is attached to the movable platen to be rotatable by the electric motor, and the movable metal mold or the movable platen is attached with a hydraulic cylinder.

10. The injection molding machine for a composite molded product according to claim 1, wherein the three or more cable carrying-and-guiding devices includes at least one cable chain.

11. The injection molding machine for a composite molded product according to claim 1, wherein the three or more cable carrying-and-guiding devices includes at least one device that carries and guides cables or hoses.

12. The injection molding machine for a composite molded product according to claim 1, wherein the three or more cable carrying-and-guiding devices includes at least one cable protection chain.

13. The injection molding machine for a composite molded product according to claim 1, wherein opening portions are provided in the fixed ends and the moving ends of the three or more cable carrying-and-guiding devices.

14. The injection molding machine for a composite molded product according to claim 1, wherein the structure includes a U-shape structure in cross section.

* * * * *